US 8,195,726 B2

(12) United States Patent
Macready et al.

(10) Patent No.: US 8,195,726 B2
(45) Date of Patent: Jun. 5, 2012

(54) SYSTEMS, DEVICES, AND METHODS FOR SOLVING COMPUTATIONAL PROBLEMS

(75) Inventors: William Macready, West Vancouver (CA); Geordie Rose, Vancouver (CA); Herbert J. Martin, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 1386 days.

(21) Appl. No.: 11/765,361

(22) Filed: Jun. 19, 2007

(65) Prior Publication Data

US 2008/0109500 A1 May 8, 2008

Related U.S. Application Data

(60) Provisional application No. 60/815,490, filed on Jun. 20, 2006.

(51) Int. Cl.
*G06J 1/00* (2006.01)
*G06F 7/38* (2006.01)
(52) U.S. Cl. ............................................ 708/1; 708/446
(58) Field of Classification Search ............... 708/1, 446
See application file for complete search history.

(56) References Cited

U.S. PATENT DOCUMENTS

| 6,838,694 | B2 | 1/2005 | Esteve et al. ............... 257/34 |
|---|---|---|---|
| 2004/0167753 | A1 | 8/2004 | Downs et al. ............... 703/2 |
| 2005/0082519 | A1 | 4/2005 | Amin et al. ............... 257/13 |
| 2005/0224784 | A1 | 10/2005 | Amin et al. ............... 257/14 |
| 2005/0250651 | A1 | 11/2005 | Amin et al. ............... 505/846 |
| 2005/0256007 | A1 | 11/2005 | Amin et al. ............... 505/170 |
| 2006/0147154 | A1 | 7/2006 | Thom et al. ............... 385/37 |
| 2006/0225165 | A1* | 10/2006 | Maassen van den Brink et al. ............... 257/9 |

FOREIGN PATENT DOCUMENTS

EP 1647924 A2 4/2006

OTHER PUBLICATIONS

"A High-Level Look at Optimization: Past, Present and Future," e-Optimization.Community, May 2000, pp. 1-5.
Blatter et al., "Design aspects of superconducting-phase quantum bits," *Physical Review B 63*: 174511-1-174511-9, 2001.
Dolan et al., "Optimization on the NEOS Server," *SIAM News 35*(6): 1-5, Jul./Aug. 2002.
Farhi et al., "Quantum Adiabatic Evolution Algorithms versus Simulated Annealing," Center for Theoretical Physics, MIT-CTP #3228, arXiv:quant-ph/0201031 v1, pp. 1-16, Jan. 8, 2002.
Feynman, "Simulating Physics with Computers," *International Journal of Theoretical Physics 21*(6/7): 467-488, 1982.
Fourer, "Optimization as an Internet Resource," *Interfaces 31*(2): 130-150, Mar.-Apr. 2001.

(Continued)

*Primary Examiner* — Tan Mai
(74) *Attorney, Agent, or Firm* — Seed IP Law Group PLLC

(57) ABSTRACT

Systems, devices, and methods for using an analog processor to solve computational problems. A digital processor is configured to track computational problem processing requests received from a plurality of different users, and to track at least one of a status and a processing cost for each of the computational problem processing requests. An analog processor, for example a quantum processor, is operable to assist in producing one or more solutions to computational problems identified by the computational problem processing requests via a physical evolution.

41 Claims, 7 Drawing Sheets

OTHER PUBLICATIONS

Friedman et al., "Quantum superposition of distinct macroscopic states," *Nature 406*: 43-46, Jul. 6, 2000.

Il'ichev et al., "Continuous Monitoring of Rabi Oscillations in a Josephson Flux Qubit," *Physical Review Letters 91*(9): 097906-1-097906-4, week ending Aug. 29, 2003.

Landauer, "Hybrid Digital/Analog Computer Systems," *Computer*, pp. 15-24, Jul. 1976.

Makhlin et al., "Quantum-state engineering with Josephson-junction devices," *Reviews of Modern Physics 73*(2): 357-400, Apr. 2001.

Mooij et al., "Josephson Persistent-Current Qubit," *Science 285*: 1036-1039, Aug. 13, 1999.

Nielsen et al., *Quantum Computation and Quantum Information*, Cambridge University Press, Cambridge, 2000, "7.8 Other implementation schemes," pp. 343-345.

Orlando et al., "Superconducting persistent-current qubit," *Physical Review B 60*(22): 15 398-15 413, Dec. 1, 1999.

Rubin et al., "Hybrid Computation 1976 and Its Future," *Computer*, pp. 37-46, Jul. 1976.

Shirts et al., "Computing: Screen Savers of the Word Unite!," *Science Online 290*(5498): 1903-1904, Dec. 8, 2000.

Shor, "Introduction to Quantum Algorithms," AT&T Labs—Research, arXiv:quant-ph/0005003 v2, pp. 1-17, Jul. 6, 2001.

\* cited by examiner

SYSTEMS, DEVICES, AND METHODS FOR SOLVING COMPUTATIONAL PROBLEMS

CROSS-REFERENCE TO RELATED APPLICATION

This application claims benefit, under 35 U.S.C. §119(e), of U.S. Provisional Patent Application No. 60/815,490, filed Jun. 20, 2006, which is incorporated herein, by reference, in its entirety.

BACKGROUND

The present disclosure is directed to analog computing and, more particularly, to solving computational problems using analog processors.

DESCRIPTION OF THE RELATED ART

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation, involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi, E. et al., "Quantum Adiabatic Evolution Algorithms versus Simulated Annealing", arXiv.org:quant-ph/0201031 (2002), pp 1-24.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle = a|0\rangle + b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus becoming to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar to those used for conventional integrated circuits.

Superconducting qubits are a type of superconducting device that can be included in a superconducting integrated circuit. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges are pairs of electrons called Cooper pairs. A Cooper pair has a charge of $2e$ and are two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. No. 6,838,694 and U.S. patent application Ser. No. 2005-0082519.

Computational Complexity Theory

In computer science, computational complexity theory is the branch of the theory of computation that studies the resources, or cost, of the computation required to solve a given computational problem. This cost is usually measured in terms of abstract parameters such as time and space, called computational resources. Time represents the number of steps required to solve a problem and space represents the quantity of information storage required or how much memory is required.

Computational complexity theory classifies computational problems into complexity classes. The number of complexity classes is ever changing, as new ones are defined and existing ones merge through the contributions of computer scientists. The complexity classes of decision problems include:

1. P—The complexity class containing decision problems that can be solved by a deterministic UTM using a polynomial amount of computation time;

2. NP ("Non-deterministic Polynomial time")—The set of decision problems solvable in polynomial time on a non-deterministic UTM. Equivalently, it is the set of problems that can be "verified" by a deterministic UTM in polynomial time;

3. NP-hard (Nondeterministic Polynomial-time hard)—A problem H is in the class NP-hard if and only if there is an NP-complete problem L that is polynomial time Turing-reducible to H. That is to say, L can be solved in polynomial time by an oracle machine with an oracle for H;

4. NP-complete—A decision problem C is NP-complete if it is complete for NP, meaning that:
   (a) it is in NP and
   (b) it is NP-hard, i.e., every other problem in NP is reducible to it. "Reducible" means that for every problem L, there is a polynomial-time many-one reduction, a deterministic algorithm which transforms instances $l \in L$ into instances $c \in C$, such that the answer to c is YES if and only if the answer to l is YES. To prove that an NP problem A is in fact an NP-complete problem it is sufficient to show that an already known NP-complete problem reduces to A.

Decision problems have binary outcomes. Problems in NP are computation problems for which there exists a polynomial time verification. That is, it takes no more than polynomial time (class P) in the size of the problem to verify a potential solution. It may take more than polynomial time, however, to find a potential solution. NP-complete problems are at least as hard as any problem in NP.

Optimization problems are problems for which one or more objective functions are minimized or maximized over a set of variables, sometimes subject to a set of constraints. For example, the Traveling Salesman Problem ("TSP") is an optimization problem where an objective function representing, for example, distance or cost, must be optimized to find an itinerary, which is encoded in a set of variables representing the optimized solution to the problem. For example, given a list of locations, the problem may be finding the shortest route that visits all locations exactly once. Other examples of optimization problems include Maximum Independent Set, integer programming, constraint optimization, factoring, prediction modeling, and Max SAT. These problems are abstractions of many real-world optimization problems, such as operations research, financial portfolio selection, scheduling, supply management, circuit design, and travel route optimization. Many large-scale decision-based optimization problems are NP-hard. See e.g., "*A High-Level Look at Optimization: Past, Present, and Future*" e-Optimization.com, 2000.

Simulation problems typically deal with the simulation of one system by another system, usually over a period of time. For example, computer simulations can be made of business processes, ecological habitats, protein folding, molecular ground states, quantum systems, and the like. Such problems often include many different entities with complex interrelationships and behavioral rules. In Feynman it was suggested that a quantum system could be used to simulate some physical systems more efficiently than a UTM.

In practice, many optimization and simulation problems are not solvable in a reasonable amount of time using UTMs. Because of this limitation, there is need in the art for computational devices capable of solving computational problems beyond the scope of UTMs. In the field of protein folding, for example, grid computing systems and supercomputers have been used to try to simulate large protein systems. See Shirts et al., 2000, *Science* 290, pp. 1903-1904, and Allen et al., 2001, *IBM Systems Journal* 40, p. 310. The NEOS solver is an online network solver for optimization problems, where a user submits an optimization problem, selects an algorithm to solve it, and then a central server directs the problem to a computer in the network capable of running the selected algorithm. See e.g., Dolan et al., 2002, *SIAM News* Vol. 35, p. 6. Other digital computer-based systems and methods for solving optimization problems can be found, for example, in Fourer et al., 2001, *Interfaces* 31, pp. 130-150. All these methods are limited, however, by the fact they utilize digital computers, which are UTMs, and accordingly, are subject to the limits of classical computing that impose unfavorable scaling between problem size and solution time.

BRIEF SUMMARY

In one aspect, the present systems, devices and methods is directed to a problem solving system, including at least a first digital processor and a first analog processor. The first digital processor may be configured to track computational problem processing requests received from a plurality of users, and to track at least one of a status or a processing cost for each of the computational problem processing requests. The first analog processor may be operable to produce one or more solutions to computational problems identified by the computational problem processing requests.

In another aspect, the present disclosure is directed to a problem solving system, including a receiver, a pre-processing manager, an analog processor interface, an analog processor, a post-processing manager, and an accounting manager. The receiver may be configured to receive a computational problem processing request, and to provide identity information indicative of an entity responsible for the received computational problem processing request. The receiver may further be configured to send a response to the computational problem processing request. The pre-processing manager may be configured to receive the computational problem processing request from the receiver, and convert the computational problem processing request into a first series of instructions. The analog processor interface may be configured to receive the first series of instructions from the pre-processing manager. The analog processor may be configured to receive a second series of instructions from the analog processor interface, and obtain a solution to the computational problem processing request by a physical evolution of the analog processor. The post-processing manager may be configured to convert the solution into a post-processed solution. The accounting manager may be configured to receive the identity information from the receiver, track processing data associated with the computational problem processing request, and provide processing information associated with the computational problem processing request.

In another aspect, the present disclosure is directed to a method for solving problems, including receiving a computational problem, pre-processing the computational problem, obtaining a solution to the computational problem using an analog processor, post-processing the solution, outputting the solution, and determining a processing cost associated with obtaining the solution to the computational problem.

In another aspect, the present disclosure is directed to a method of using at least one analog processor to solve a computational problem, including receiving data indicative of one or more computational problems to be solved, automatically estimating a cost associated with solving the one or more computational problems, and communicating at least one of execution data, a cost, and a solution via at least one communication connection between a client device and a computational problem solving service system.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with analog and quantum processors, such as quantum devices, coupling devices, and control systems including microprocessors and drive circuitry have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem solving system including "a quantum processor" includes a single quantum processor, or two or more quantum processors. It should also be noted that the term "or" is generally employed in its sense including "and/or" unless the content clearly dictates otherwise.

Figure 1A:
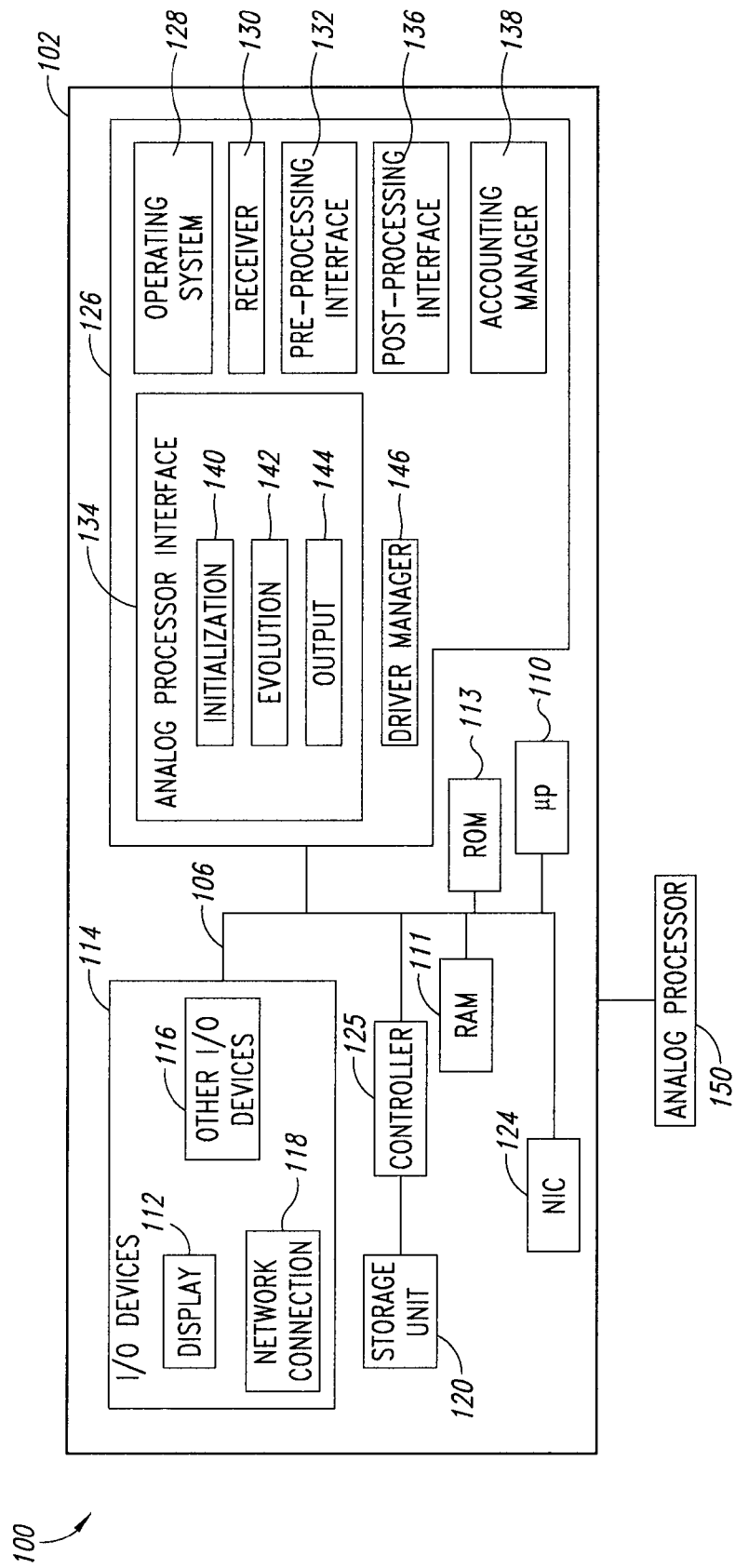
FIGS. 1A and 1B are functional diagrams showing systems for solving computational problems according to one illustrative embodiment.

The headings provided herein are for convenience only and do not interpret the scope or meaning of the embodiments.
Systems For Solving Computational Problems FIG. 1A shows an exemplary problem solving system 100. Problem solving system 100 may include a computer 102 and an analog processor 150. An analog processor is a processor that employs the fundamental properties of a physical system to find the solution to a computation problem. In contrast to a digital processor, which requires an algorithm for finding the solution followed by the execution of each step in the algorithm according to Boolean methods, analog processors do not involve Boolean methods.

Computer 102 may include one or more controllers such as microprocessor 110, non-volatile storage controller 125, digital signal processor (DSP) (not shown), analog processor 150, and the like. Computer 102 may further include one or more memories 126 coupled to controllers 110, 125, 150 by one or more buses 106. Examples of one or more memories include a system memory 126, such as high speed random-access memory (RAM), for storing system control programs (e.g., operating system 128, application programs loaded from main non-volatile storage unit 120, data, and the like), and a read-only memory (ROM). Computer 102 may also include a main non-volatile storage unit 120, a user interface 114, a network interface card (NIC) 124, communication circuitry, a network connection 118, and the like. User interface 114 may also include one or more input devices 116 such as a display 112, a mouse, a keyboard, and other peripheral devices.

Computer 102 may include an operating system 128 for handling various system services, such as file services, and for performing hardware dependent tasks. Examples of operating system 128 include UNIX, Windows NT, Windows XP, DOS, LINUX, VMS, and the like. Alternatively, no operating system 128 may be present and instructions may be executed, for example, in a daisy chain manner. In an embodiment, computer 102 may take the form of a digital computer. In another embodiment, analog processor 150 may be in communication with computer 102.

Figure 1B:
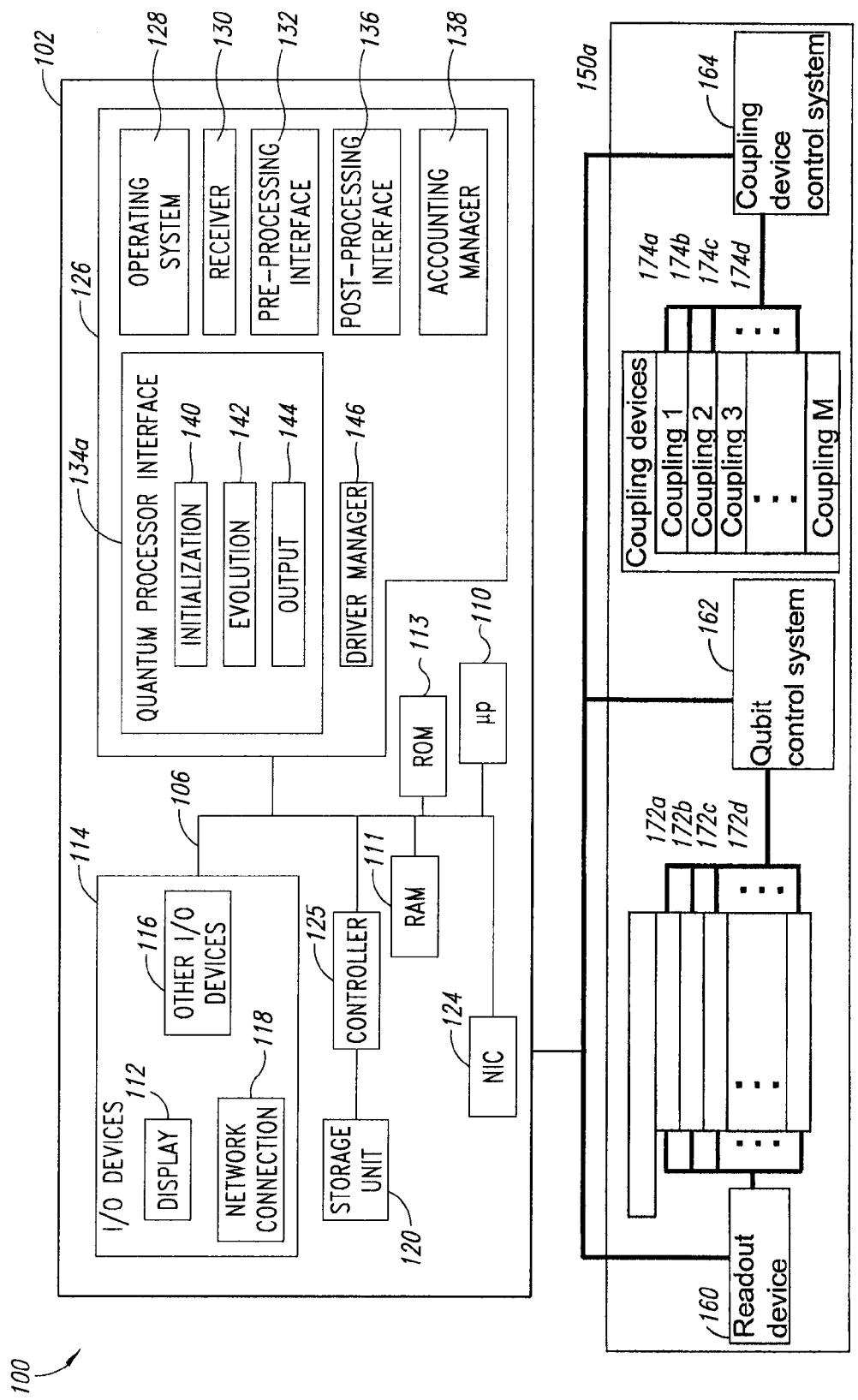

Analog processor 150 may take the form of quantum processor 150a shown in FIG. 1B, including a plurality of qubits 172 partitioned into qubit nodes, a plurality of coupling devices 174, a readout device 160, a qubit control system 162, and a coupling device control system 164. Quantum processor 150a may include at least two qubits 172, at least one coupling device 174, and at least one local bias device.

Qubits 172 serve as the basis for performing quantum computation, and may take the form of superconducting qubits. Examples of qubits include quantum particles, atoms, electrons, photons, ions, and the like. Typical superconducting qubits, for example, have the advantage of scalability and are generally classified depending on the physical properties used to encode information including, for example, charge and phase devices, phase or flux devices, hybrid devices, and the like.

Quantum processor 150a may further include a readout device 160. Readout device 160 may include a plurality of dc-SQUID magnetometers, each inductively connected to a different qubit 172. NIC 124 may be configured to receive a voltage or current from readout device 160 such as dc-SQUID magnetometers, including a loop of superconducting material interrupted by two Josephson junctions, are well known in the art.

Qubit control system 162 may include one or more controllers for qubit 172. Coupling device control system 164 may include one or more coupling controllers for coupling devices 174. Each respective coupling controller in coupling device control system 164 may be configured to tune the coupling strength of a corresponding coupling device 174 from zero to a maximum value. Coupling devices 174 may be tuned, for example, to provide ferromagnetic or anti-ferromagnetic coupling between qubits 172.

Problem solving system 100 may further include a number of programs and data structures. Typically, some or all of the data structures and programs may be stored in one or more memories including system memory 126, random-access memory 111, read-only memory 113, and the like. Likewise these programs and data structures may be processed using one or more microprocessors 110, analog processors 150, and the like. For ease of presenting the various features and advantages of the present systems, devices, and methods, however, such data structures, and programs are drawn as components of memory 126. It will be appreciated, however, that at any given time the programs and data structures illustrated in memory 126 may be stored, for example, in main non-volatile storage unit 120. In some embodiments, some or all of the data structures and programs may be stored on one or more remote computers not illustrated in FIG. 1A, provided that the one or more remote computers are addressable by computer 102, i.e., that there is some communication measure between the remote computer and computer 102 such that data can be exchanged among computers over, for example, a data network (e.g., a serial connection, a parallel connection, Ethernet, and the like) using a communication protocol (e.g., the Internet, FTP, telnet, SSH, IP, and the like). In some other embodiments, some or all of the data structures and programs may be redundantly stored and/or processed on one or more remote computers (not shown), provided that the one or more remote computers are addressable by computer 102.

Problem solving system 100 may further include a receiver 130, a pre-processing manager 132, an analog processor interface 134 such as a quantum processor interface 134a, a post-processing manager 136, and an accounting manager 138. Receiver 130 may be configured to receive problems to be solved on analog processor 150. Receiver 130 may further be configured to send a response to a computational problem processing request.

In an embodiment, receiver 130, pre-processing manager 132, quantum processor interface 134a, post-processing manager 136, and accounting manager 138 are all implemented in one or more digital computing systems. In another embodiment, at least one of receiver 130, the pre-processing manager 132, quantum processor interface 134a, and post-processing manager 136 may be in a location remote from quantum processor 150a.

Microprocessor 110 may be configured to track computational problem processing requests received from a plurality of different users, and to track at least one of a status and a processing cost for each of the computational problem processing requests. Processing cost may include at least one of an amount indicative of digital processor usage in time, money, energy or resources, and/or an amount of analog processor usage, such as in time, money, energy or resources. Processing cost may further include tracking resource costs, such as power usage or liquid helium consumption. In an embodiment, the processing cost may further include an amount indicative of human consulting, such as time, money or resources. In another embodiment, Processing cost may further include at least one of a pre-processing cost or a post-processing cost, indicative of an amount, e.g. in time or money, to pre-process or post-process computational problem solving request, respectively. In yet another embodiment, pre-processing or post-processing costs may be indicative of a fee for use of a pre-processing program or a post-processing program, respectively.

Microprocessor 110 may further be configured to determine an estimate for producing one or more solutions to computational problem processing requests based in part on a comparison to problems of like complexity.

In an embodiment, problem solving system 100 may include additional microprocessors 110 configured to redundantly track computational problem processing requests received from a plurality of different users, and to redundantly track at least one of a status or a processing cost for each of computational problem processing requests.

Analog processor 150 may be operable to produce one or more solutions to computational problems identified by computational problem processing requests. In some embodiments, analog processor 150 may be operable to obtain one or more solutions to computational problems via a physical evolution of analog processor. In another embodiment, problem solving system 100 may include additional analog processors 150 operable to redundantly co-process one or more solutions to computational problems identified by computational problem processing requests.

In some embodiments, problem solving system 100 may be configured to provide access to one or more subscribers, servers, users and/or clients.

A computational problem may be received by problem solving system 100 via a telephone modem, a wireless modem, a local area network connection, a wide area network connection, a portable digital data device, and the like. Information received by receiver 130 may include initial values of couplings between qubits 172, local bias of qubits 172, runtime control parameters, and the like. Alternatively, information received by receiver 130 may include a graph that represents a computational problem, macro-language instructions, such as AMPL, that define a computational problem, and the like.

Receiver 130 may be operable to provide instructions for scheduling a computation, as well as acquiring the solution to the problem. In an embodiment, a solution of the computation is collected as an output from quantum processor 150a. In another embodiment, receiver 130 may include a graphical user interface (GUI), Command Line Interfaces (CLI), Text User Interface (TUI), and the like. In another embodiment, receiver 130 is operable to receive graphical representations of the computational problem.

Problem solving system 100 may further include one or more communications links, such as, for example, a network connection 118, for sending and receiving data among at least two of receiver 130, pre-processing manager 132, quantum processor interface 134a, quantum processor 150a, and post-processing manager 136. Communications link may further include an encryption interface (not shown).

Pre-processing manager 132 may be configured to receive the computational problem processing request from receiver 130, and convert computational problem processing requests into a first series of instructions. Pre-processing manager 132 may further be configured for determining a first Hamiltonian. In an embodiment, pre-processing manager 132 is configured for mapping a computational problem into a problem of an equivalent complexity class. In another embodiment, pre-processing manager 132 includes logic to map the computational problem into at least one of a problem of equivalent, greater or lesser complexity class. In an embodiment, the logic to map the computational problem onto the analog processor includes instructions for mapping the computational problem onto a topological representation and embedding the topological representation onto the analog processor. In an embodiment, the topological representation is in a form of at least one of a planar graph or a non-planar graph. In another embodiment, the topological representation is a graph in the form of a plurality of vertices, and one or more edges.

In another embodiment, pre-processing manager 132 is configured for mapping a computational problem onto analog processor 150, for example, quantum processor 150a. Mapping a computational problem onto analog processor 150 may include, for example, mapping the computational problem onto a graph and embedding the graph onto analog processor 150.

Quantum processor interface 134a may be operable to receive a first series of instructions from pre-processing manager 132 quantum processor 150a may be configured to receive a second series of instructions from quantum processor interface 134a, and obtain a solution to the computational problem processing request by a physical evolution of the analog processor. Post-processing manager 136 may be configured to convert the solution into a post-processed solution. Accounting manager 138 may be configured to receive identity information from the receiver, track processing data associated with the computational problem processing request, and provide processing information associated with the computational problem processing request. In an embodiment, the processing information may include at least one of cost of pre-processing or post-processing the computational problem processing request, a cost of classical processor usage, a cost of analog processor usage, a cost of human consulting, or a computational problem processing estimate based in part on a comparison to problems of like complexity.

Pre-processing manager 132 may include a mapper interface configured to map a computational problem to be solved into a corresponding problem description that is solvable by analog processor 150. The mapper interface may be configured to map problems from one graphical representation into a target graphical representation required for a specific configuration of analog processor 150. In an embodiment, the target graphical representation may include vertices and edges, analog processor 150 may take the form of quantum processor 150a that may include a lattice of qubits 172 and coupling devices 174, and each coupling device 174 may be configured to couple two qubits 172 together.

The mapper interface may be configured to map some NP problems (e.g., a mathematical problem such as Maximum Independent Set, Max Clique, Max Cut or k-SAT, or a problem such as an integer programming problem, a constraint optimization problem, a factoring problem, a prediction modeling problem, an operations research problem, a financial portfolio selection problem, a scheduling problem, a supply management problem, a circuit design problem, a travel route optimization problem, a business process simulation problem, an ecological habitat simulation problem, a protein folding simulation problem, a molecular ground state simulation problem or a quantum system simulation problem, and the like) into another NP problem, such as the Ising Spin Glass problem or other problems already mentioned.

Once the target graphical representation needed to solve a desired problem has been mapped by the mapper interface, quantum processor interface 134a is used to set up the coupling values and local bias values for coupling devices 174 and qubits 172 in order to map the representation onto quantum processor 150a. In an embodiment, three discrete program modules may provide the functions of quantum processor interface 134a: initialization module 140, evolution module 142, and output module 144.

Initialization module 140 may be configured to determine the appropriate values of coupling $J_{ij}$ for coupling devices 174 and values of local bias $h_i$ for qubits 172. Initialization module 140 may be configured to convert aspects of a problem definition into physical values, such as coupling strength values and node bias values, which can be programmed into quantum processor 150a. Initialization module 140 may then be configured to send the appropriate signals along one or more internal buses 106 into NIC 124. NIC 124, in turn, may be configured to send such commands to qubit control system 162 and coupling device control system 164.

For any given problem, evolution module 142 may be configured to determine the appropriate values, at each point in time for the duration of the computation, of coupling $J_{ij}$ for coupling devices 174 and values of local bias $h_i$ for qubits 172 to fulfill some predetermined evolution schedule (i.e. the schedule for how the evolution is to take place). Once determined, the appropriate coupling device values and local bias values for an evolution schedule are sent as signals, via one or more buses 106, to NIC 124. NIC 124, in turn, is configured to send such commands to quantum device control system 162 and coupling device control system 164.

The computation of analog processor 150 may be configured to operate as, for example, an adiabatic evolution or an annealing evolution. An adiabatic evolution is the evolution used in adiabatic analog computing, and evolution module 142 may be configured to evolve the state of analog processor 150 in accordance with the evolution used in adiabatic quantum computation. See, e.g., U.S. Patent Publication Nos. 2005-0256007, 2005-0250651, and 2005-0224784 each titled "Adiabatic Quantum Computation with Superconducting Qubits." Annealing is another form of evolution applicable to some analog processors 150, and evolution module 142 may be configured to evolve the state of analog processor 150 in accordance with annealing evolution.

Quantum processor 150*a* may be configured to solve a quantum problem based on signals provided by initialization module 140 and evolution module 142. Once the problem has been solved, the solution to the problem may be measured from the states of qubits 172 by readout device 160. Output module 144 may be configured in conjunction with readout device 160 to read this solution.

Memory 126 may further include a driver module 146 configured to output signals to analog processor 150. NIC 124 may be configured to interface with qubits 172 and coupling devices 174, either directly or through readout device 160, qubit control system 162, and/or coupling device control system 164. Alternatively, NIC 124 may include software and/or hardware that translates commands from driver module 146 into signals (e.g., voltages, currents) that are directly applied to qubits 172 and coupling devices 174. In an embodiment, NIC 124 may include software and/or hardware for translating signals (representing a solution to a problem or some other form of feedback) from qubits 172 and coupling devices 174 such that output module 144 can interpret them. In some embodiments, initialization module 140, evolution module 142, and/or output module 144 may communicate with driver module 146, rather than directly with NIC 124, to send and receive signals from analog processor 150.

The functionality of NIC 124 can be divided into two classes: data acquisition and control. Different types of chips may be used to handle each discrete functional class. Data acquisition is used to measure physical properties of qubits 172 after quantum processor 150*a* has completed a computation. Such data can be measured using any number of customized or commercially available data acquisition microcontrollers including data acquisition cards manufactured by Elan Digital Systems (Fareham, UK) including AD132, AD136, MF232, MF236, AD142, AD218, CF241 cards, and the like. Alternatively, a single type of microprocessor, such as Elan D403C or D480C, may handle data acquisition and control. There may be multiple NICs 124 in order to provide sufficient control over qubits 172 and coupling devices 174 and in order to measure the results of a quantum computation on quantum processor 150*a*.

Computer 102 may further be configured for receiving a computational problem and transmitting the solution of a computational problem processed by analog processor 150 to another system, such as via a telephone modem, a wireless modem, a local area network (LAN) connection, a wide area network (WAN) connection, a portable digital data device, and the like. Computer 102 may be configured to generate a carrier wave embodying a data signal, with the solution to the computational problem processed by analog processor 150 embedded therein.

Analog processor 150 may be in the form of a superconducting quantum computer, examples of which include qubit registers, readout devices, and ancillary devices. Superconducting quantum computers normally are operated at millikelvin temperatures and often are operated in a dilution refrigerator. An example of a dilution refrigerator is the Leiden Cryogenics B.V. MNK 126 series (Galgewater No. 21, 2311 VZ Leiden, The Netherlands). All or part of the components of quantum processor 150*a* may be housed in a dilution refrigerator. For example, qubit control system 162 and coupling device control system 164 may be housed outside a dilution refrigerator with the remaining components of quantum processor 150*a* being housed inside a dilution refrigerator.

Receiver 130, quantum processor interface 134*a*, and driver module 146, or any combination thereof, may be implemented via existing software packages or program languages. Suitable software packages include, for example, MATLAB (The MathWorks, Natick, Mass.), LabVIEW (National Instruments, Austin, Tex.), Maple (Waterloo Maple Inc., Waterloo, Ontario, Canada.), Mathematica (Wolfram Research, Inc., Champaign, Ill.), and the like. Suitable programming languages include representative implementations of various programming language paradigms, including but not limited to, object-oriented (e.g., Java, C++, C#, Smalltalk), procedural (e.g., C, Pascal, Ada, Modula, BASIC), scripting (e.g., Perl, Ruby, Python, PHP, ASP, etc.), functional (e.g., Miranda, ML, Lisp, Scheme, etc.), etc. In an embodiment, receiver 130 may be configured to receive a computational problem processing request, and to provide identity information indicative of an entity responsible (e.g., financially responsible) for the received computational problem processing request. In another embodiment, receiver 130 may be configured to receive computational problem processing requests from one or more sources, such as subscribers, servers, users and/or clients. In another embodiment, receiver 130 may further be configured to send a response to the computational problem processing request.

In an embodiment, the present systems, devices, and methods may be implemented as a computer program product that includes a computer program mechanism embedded in a computer readable storage medium. For example, the computer program product may include aspects of quantum processor interface 134*a*, operating system 128, receiver 130, pre-processing manager 132, post-processing manager 136, accounting manager 138, and the like. Aspects of the various interfaces, managers, and modules, may be stored on a CD-ROM, DVD, magnetic disk storage product, any other computer readable data or program storage product, and may also be distributed electronically, via the Internet or otherwise, by transmission of a computer data signal (in which the software modules are embedded) embodied in a carrier wave, and the like.

In an embodiment, problem solving system 100 may include a microprocessor 110, a receiver 130, a pre-processing manager 136, a quantum processor interface 134*a*, and an accounting manager 138. Receiver 130 may be configured to receive a computational problem processing request and provide identity information indicative of an entity responsible for the received computational problem processing request. Accounting manager 138 may further be configured to track processing data associated with the computational problem processing request, and provide processing information associated with the computational problem processing request. Quantum processor interface 134a may be configured to convert the computational problem processing requests into a series of instructions receivable by quantum processor 150a, to obtain a solution to the computational problem processing request, and/or to send a solution to the computational problem.

In other embodiments, problem solving system 100 may include additional microprocessors 110 configured to store execution data including processing variables, solution parameters, simulation trajectories, checkpoints, and the like throughout the processing of a computational problem processing request. For example, by storing execution data at predetermined times or after predetermined acts, it may be possible to return problem solving system 100 to a predetermined point or checkpoint. Storing the execution data at predetermined times may include, for example, storing the execution data at regular intervals or according to a user-determined schedule.

In an embodiment, in the event that problem solving system 100 experiences a power loss, and/or an application or the operating system stops performing its expected function and/or portions of an application or the operating system stop responding to other parts of the system, stored processing variables, solution parameters, simulation trajectories, and/or checkpoints, and the like may be used to return problem solving system 100 to a predetermined point or checkpoint.

In an embodiment, problem solving system 100 may include a first microprocessor 110 configured to track computational problem processing requests received from a plurality of users, and to track at least one of a status and a processing cost for each of the computational problem processing requests, and a first analog processor 150 operable to co-process one or more solutions to computational problems identified by the computational problem processing requests. In another embodiment, problem solving system 100 may further include a second analog processor redundantly operable to co-process one or more solutions to the computational problems identified by the computational problem processing requests. The second analog processor may be geographically remotely located from first analog processor 150, and may be addressable by first microprocessor 110.

Figure 2B:
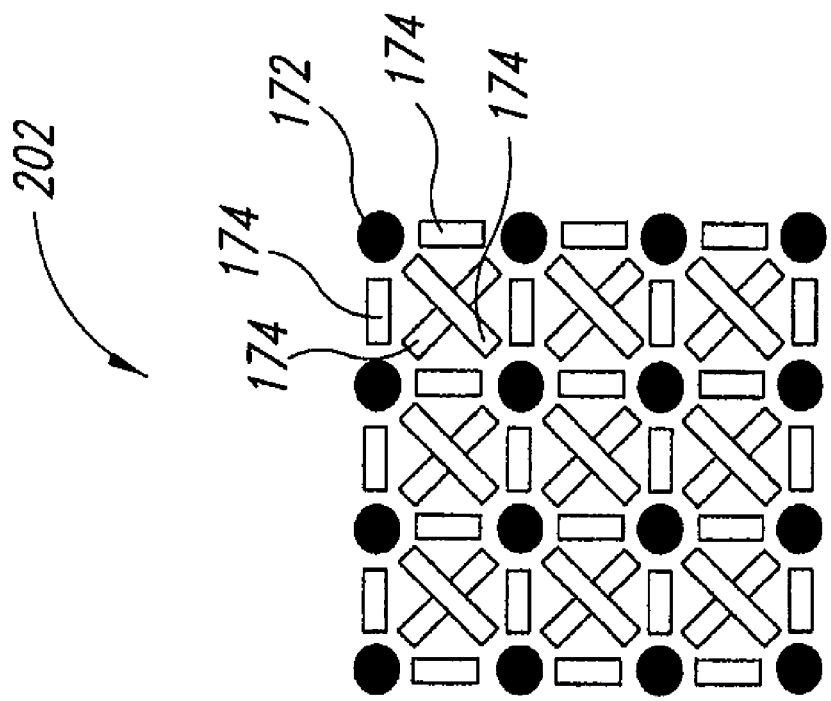
FIGS. 2A and 2B are schematic diagrams showing two-dimensional lattices of qubits according to another illustrative embodiment.
Figure 2A:
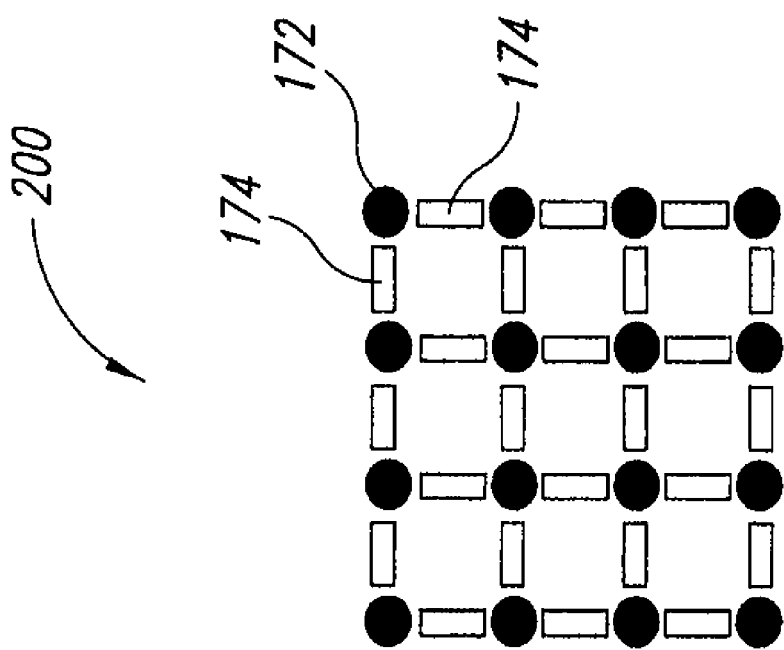

FIGS. 2A and 2B show examples of two-dimensional lattice arrangements of qubits 172. Referring to FIG. 2A, in some embodiments, qubits 172 may be arranged in a two-dimensional lattice 200 with one or more qubits 172 being coupled to their nearest neighbors via coupling devices 174. Referring to FIG. 2B, in other embodiments, qubits 172 may be arranged in a two-dimensional lattice 202 with one or more qubits 172 being coupled to their nearest and next-nearest neighbors via coupling devices 174. In an embodiment, pre-processing manager 132 may be configured to map a problem defined by an arbitrary graphical representation into an equivalent problem defined by one or more graphs. In another embodiment, quantum processor 150a may include a plurality of qubits 172 and a plurality of coupling devices 174. Qubits 172 may be arranged in two-dimensional lattices 200 or 202 with some or all of qubits 172 being coupled to their nearest and/or next-nearest neighbors. In another embodiment, pre-processing manager 132 may be configured for determining an initial coupling value for at least one coupling device 174, and determining an initial local bias value for at least one qubit 172. Quantum processor 150a may include at least two qubits 172, and quantum processor interface 134a may be configured to initialize quantum processor 150a to a first Hamiltonian, evolve the first Hamiltonian to a second Hamiltonian, and read out a quantum state of at least one qubit 172.

Embodiments of an Analog Processor

Figure 3:
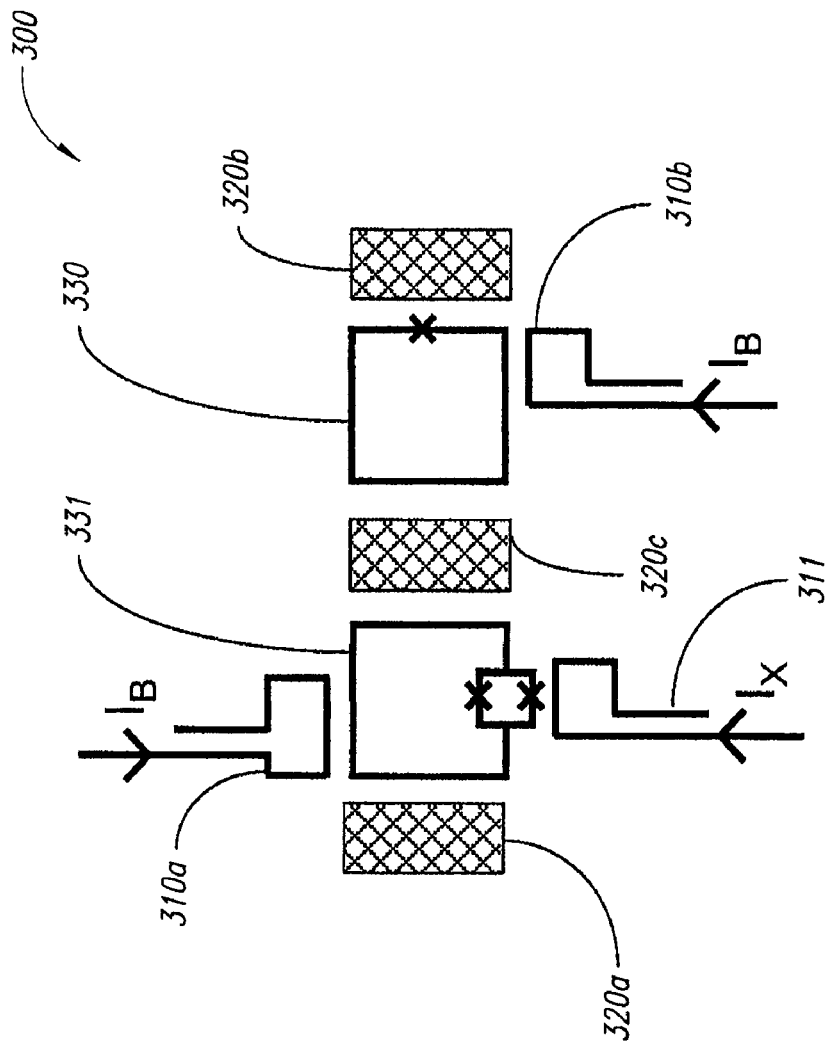
FIG. 3 is a schematic diagram showing a portion of an analog processor in the form of a quantum processor according to another illustrative embodiment.

FIG. 3 shows one example of a quantum processor portion 300 of an analog processor 150 in the form of quantum processor 150a. Quantum processor portion 300 includes two superconducting qubits 330 and 331. The two qubits include an rf-SQUID qubit 330 and an rf-SQUID qubit 331 with a compound junction (where a single Josephson junction is replaced by two parallel Josephson junctions). A coupling device 320c may couple qubits 330, 331 together. Additional coupling devices 320a and 320b may couple qubits 330, 331 to other qubits or devices (not shown). Qubits 330 and 331 may include a corresponding local bias device 310a and 310b, respectively. Qubit 331 may further include an associated readout device 311. Quantum processor portion 300 is easily extendable to form, for example, lattices 200 and 202 illustrated in FIGS. 2A and 2B. In an embodiment, a quantum processor 150a may include a plurality of quantum devices, such as qubits 330, 331, and one or more associated coupling devices 320a, 320b, and 320c. Quantum processor 150a may further include one or more readout devices 311 and one or more local bias devices 310a and 310b. In an embodiment, quantum processor 150a may include at least two qubits in the form of qubit 330 or qubit 331, at least one coupling device in the form of 320a, 320b, or 320c, and at least one local bias device in the form of 310a or 310b.

Examples of superconducting qubits include superconducting flux qubits, superconducting charge qubits, and the like. See e.g., Makhlin et al., 2001, *Reviews of Modern Physics* 73, pp. 357-400. Examples of flux qubits that may be used include rf-SQUIDs, which include a superconducting loop interrupted by one Josephson junction, persistent current qubits, which include a superconducting loop interrupted by three Josephson junctions, and the like. See e.g., Mooij et al., 1999, *Science* 285, 1036; and Orlando et al., 1999, *Phys. Rev.* B 60, 15398. Other examples of superconducting qubits can be found, for example, in Il'ichev et al., 2003, *Phys. Rev. Lett.* 91, 097906; Blatter et al., 2001, *Phys. Rev.* B 63, 174511, and Friedman et al., 2000, *Nature* 406, 43. In addition, hybrid charge-phase qubits may also be used.

Superconducting coupling devices that may be used in the present devices and methods include rf-SQUIDs and dc-SQUIDs, which couple qubits together by flux. As described previously, SQUIDs include a superconducting loop interrupted by one Josephson junction (an rf-SQUID) or two Josephson junctions (a dc-SQUID). Coupling devices 320a, 320b, 320c may be capable of both ferromagnetic and anti-ferromagnetic coupling. In the case of flux coupling, ferromagnetic coupling implies that parallel fluxes are energetically favorable and anti-ferromagnetic coupling implies that anti-parallel fluxes are energetically favorable. Alternatively, charge-based coupling devices may also be used. Other coupling devices can be found, for example, in U.S. Patent Publication No. 2006-0147154.

Examples of readout devices 311 include dc-SQUIDs. Each qubit 330, 331 in quantum processor 150a may have a corresponding readout device 311 or alternatively, there may be fewer readout devices 311 than qubits 330, 331. Local bias devices 310a, 310b may include a metal loop in proximity to a qubit that provides an external flux bias to the qubit. Local bias device 310a, 310b may also include a plurality of Josephson junctions. Again, each qubit 330, 331 in quantum processor 150a may have a corresponding local bias device or there may be fewer local bias devices than qubits 172. In some embodiments, charge-based readout and local bias devices may be used.

Methods For Solving Computational Problems

Figure 4:
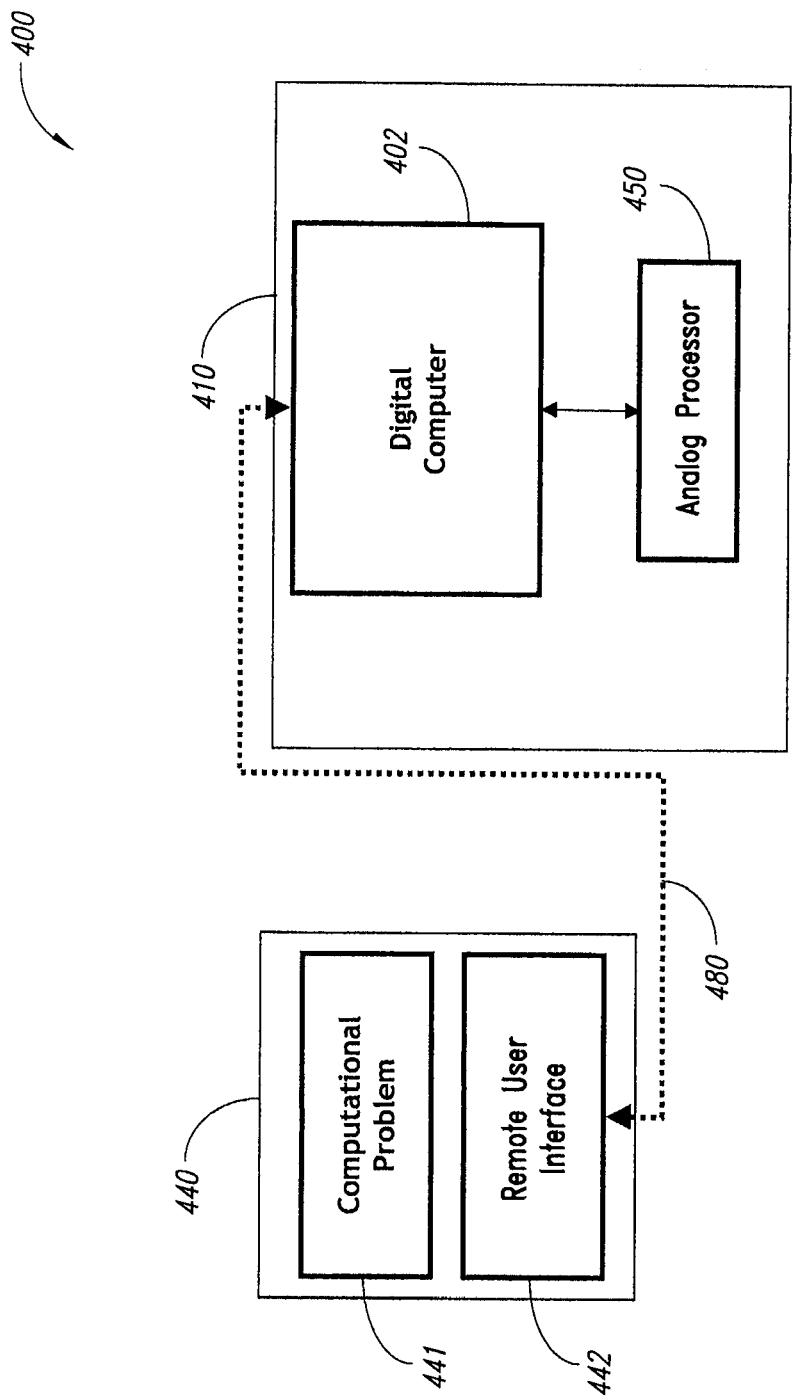
FIG. 4 is a functional diagram in the form of a system for remotely receiving a computational problem and providing a solution according to another illustrative embodiment.

FIG. 4 is a functional diagram in the form of a problem solving system 400 for remotely receiving a computational problem and providing a solution according to another illustrative embodiment.

Problem solving-system 400 includes a computational system 410 remotely accessible or useable by one or more remote users 440 that are remotely located with respect to computational system 410. In an embodiment, computational system 410 may be configured to solve a computational problem 441 as part of a service provided to the one or more remote users 440.

Computational system 410 may include at least one digital computer 402 and at least one analog processor 450, which may be similar or identical to those described above. One or more remote users 440 may be in possession of a computational problem 441 and may have access to a remote user (communications) interface 442 (e.g., computing system, telephone modem, wireless modem, a local area network (LAN) connection, a wide area network (WAN) connection, a portable digital data device, and the like). Accordingly, one or more remote users 440 may be capable of communicating with computational system 410 via one or more communications links 480.

Communications links 480 may be secure, for example by encryption, such that it is difficult for a third party to intercept and read data transferred between remote user interface 442 and computational system 410. Remote user interface 442 may be configured to allow users of the computer to remotely access the computer through an Internet web browser. Computational problem may be uploaded by user 440 to computational system 410 through remote user interface 442 and a solution to problem 441 may be transmitted to user 440 through remote user interface 442 after computational system 410 has found a solution to computational problem 441. Remote user interface 442 may be an application and transaction infrastructure such as IBM's WebSphere software, BEA's WebLogic server, and the like.

Examples of computational problem 441 include optimization problems, such as Maximum Independent Set, Max Clique, Max Cut, TSP problem, k-SAT, integer programming, Ising spin glass, and the like. Alternatively, computational problem 441 may include simulation problems, such as simulation of ecological habitats, financial markets, protein folding, or quantum systems. The complexity of computational problem 441 may include P, NP, NPH and NPC problems, and may include a problem that occurs in operations research, financial portfolio selection, scheduling, supply management, circuit design, route optimization, and the like.

Figure 5:
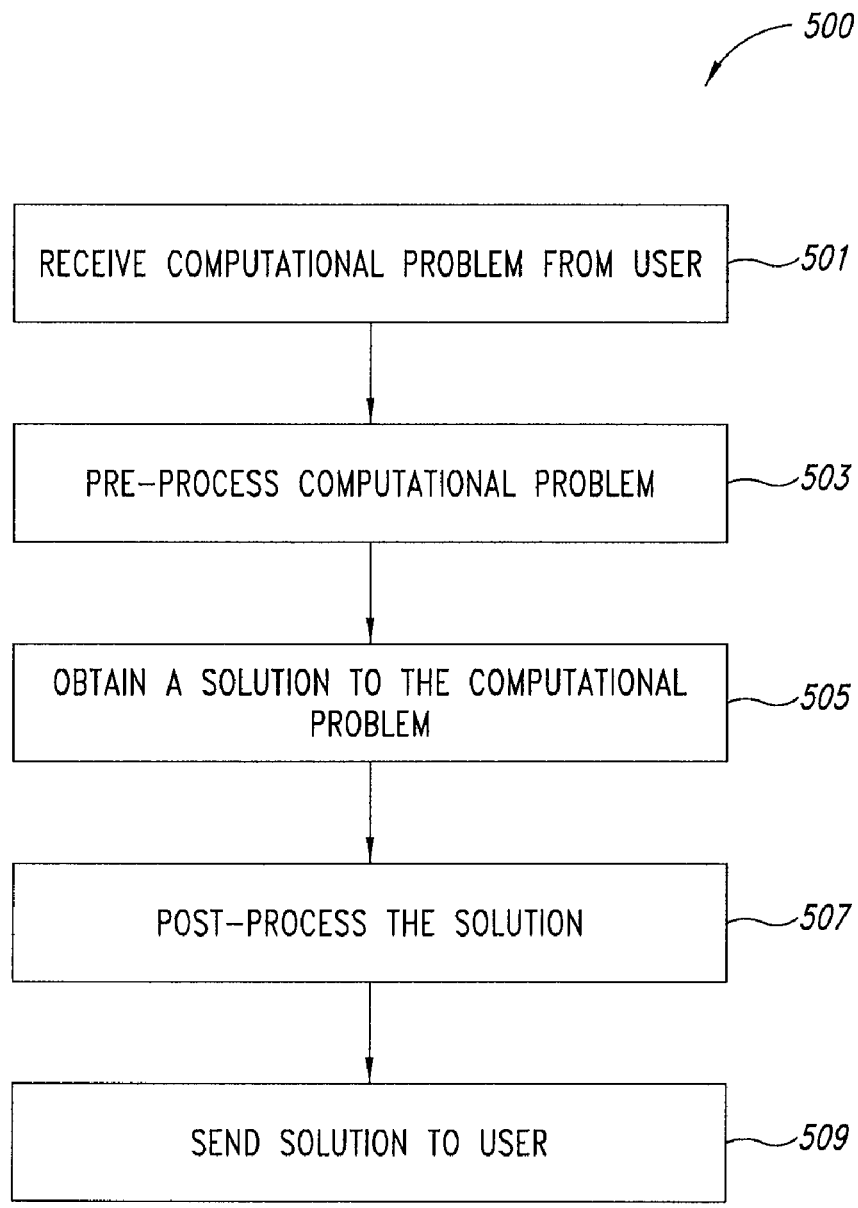
FIG. 5 is a flow diagram of a method for solving computational problems according to another illustrative embodiment.

FIG. 5 shows a flow diagram of a method 500 for solving computational problems according to another illustrative embodiment.

At 501, a computer system such as computational system 410 receives a computational problem from a user, such as one or more remote users 440 (FIG. 4). The computational problem may be received as a plurality of initial values for coupling devices 174 in quantum processor 150a, a plurality of local bias values for qubits 172 in quantum processor 150a, and/or run-time control parameters for step 505 discussed below. Alternatively, the computational problem may be received in the form of a graph that represents the computational problem or it may be described with a programming language, such as C++, Java, AMPL, Matlab instructions, Mathematica instructions, Maple instructions, and the like. In particular, a receiver, such as receiver 130 of system 100 in FIG. 1A, may receive the computational problem.

At 503, a computer such as digital computer 402 of computational system 410 pre-processes and/or otherwise transforms the computational problem received from the user into a form that can be readily applied to an analog processor such as analog processor 450 in order to obtain a solution. In particular, the pre-processing and/or transformation may be performed by computer 102 (FIGS. 1A, 1B and 4), pre-processing manager 132, and/or quantum processor interface 134a. Alternatively, at least some of pre-processing 503 may be performed on remote user interface 442 prior to receipt of the computational problem by the user's system, such as via computational system 410.

In order for a computational problem to be readily solved by an analog processor 150, it may be necessary to find the value of several variables, the values being derived from the specific details of the computational problem. These variables may include initial local bias values $h_i$ for qubits 172 in quantum processor 150a, initial coupling values $J_{ij}$ between qubits 172 in quantum processor 150a, and run-time control parameters that determine how the local bias and coupling values change over time.

Pre-processing 503 may include mapping the computational problem onto analog processor 150, for example, by constructing a graph that represents the computational problem and then embedding that graph onto the specific layout of quantum processor 150a, such as lattices 200 and 202 of FIGS. 2A and 2B. The mapping may include mapping the computational problem onto a graph and then mapping the graph onto the layout of analog processor 150. The computational problem may be mapped into a problem with an equivalent complexity class and/or may be broken into smaller sub-problems that can each be solved separately by analog processor 150 and then the sub-solutions combined to form the solution to the computational problem.

Mapping may be accomplished, for example, by pre-processing interface 132 of system 100 of FIG. 1A. See e.g., U.S. Patent Publication No. 2006-0225165. Pre-processing 503 may also include converting non-quadratic constraints in the computational problem to quadratic constraints or linear constraints.

If one or more remote users 440 provide some of the pre-processing variables, these provided values may be directly passed on to analog processor 150. Additionally or alternatively, pre-processing 503 may include verifying that the data sent provides reasonable values for the variables. In addition, if the data sent by one or more remote users 440 is encrypted, then pre-processing and/or transformation 503 may include decrypting the data. If a user sends the computational problem as a programming language construction, pre-processing 503 may also include compiling the instructions into assembly language, machine code, object code or another format and/or converting the instructions into a graph that represents the computational problem, which can then be mapped onto analog processor 150. The components involved in pre-processing the computational problem may depend on the format in which one or more remote users 440 send the computational problem, and, for example, pre-processing 503 may require the creation of additional variables to aid in solving the computational problem.

At 505, a solution for the computational problem is obtained, for example, under the control of quantum processor interface 134a of system 100. Methods for solving computational problems include those outlined in U.S. Patent Publication No. 2006-0225165, such as adiabatic quantum evolution, classical annealing, and quantum annealing.

For example, the first part of step 505 may involve setting an analog processor 150 to a first set of initial values. Using system 100 of FIGS. 1A and 1B as an example, initialization module 140 may be configured to send initialization instructions to analog processor 150 through NIC 124. The initial instructions may include, for example, setting the initial states of qubits 172 through qubit control system 162, setting the initial states $J_{ij}$ of coupling devices 174 through coupling device control system 164, and setting the initial values of the local bias devices $h_i$ (not pictured in FIG. 1B) for one or more qubits 172. The initial values for these devices may be determined from pre-processing 503, and the initial state of analog processor 150 may be defined as an initial Hamiltonian of analog processor 150.

Analog processor 150 may subsequently undergo an physical evolution from an initial Hamiltonian to a final Hamiltonian. The evolution may be controlled by evolution module 142, and evolution module 142 may be configured for performing different types of evolutions. Evolution usually requires changing one or more physical variables of analog processor 150, which depend upon the type of evolution being performed.

Independent of which type of evolution is used, at the conclusion of the evolution, one or more qubits 172 are measured using readout device 160. Output module 144 may be operable to control the readout process.

Obtaining solution, at 505, may be performed more than once, and where more than one evolution is performed, the type of evolution, the initial values or the characteristics of the evolution may be varied. For example, where the computational problem is broken into sub-problems, each sub-problem may be solved separately in step 505 and/or both analog processor 150 and computer 102 may work together to obtaining a solution to the computational problem. For example, computer 102 may perform some computational tasks to aid analog processor 150.

In some embodiments, at 507, the obtained solution is post-processed. Post-processing 507 may, for example, be performed by pre-processing interface 132 in the form of a mapper interface (FIG. 1A). The solution of the computational problem may initially be defined by raw measurement data, including, for example, the states of one or more qubits 172 (FIG. 1B). At the end of the evolution, the solution of the computational problem may be defined by the final values of the coupling values of coupling devices 164, and the final values of the local bias devices. All or a portion of post-processing 507 may be accomplished by a digital computer, such as computer 102. Alternatively, or additionally, some or all of post-processing 507 may be performed by remote user interface 442 after transmission of the data, described below.

Post-processing 507 may include conversion of the raw measurement data into another form. For example, post-processing 507 may include performing on the solution the reverse of pre-processing 503, such as eliminating extra variables created during pre-processing operations 503, piecing together sub-solutions in order to form the complete solution in instances where the computational problem was broken into sub-problems, or converting the raw measurement data to match the same form of data that was received from remote user interface 442. Alternatively, the raw measurement data may be converted into a planar or non-planar graph representing the solution, a description of the solution written in a high-level programming language, or another format of data. Post-processing 507 may also include encrypting the data containing the solution.

At 509, the solution to the computational problem is sent back to remote user interface 442. In particular, receiver 130 (FIG. 1A) may transmit the solution. Obtaining a solution to the computational problem may include repeated performance of the above-described acts before transmitting the solution at 509. In an embodiment, repeated performance of the above-described acts may include storing one or more solution parameters and updating for at least one new parameter.

Figure 6:
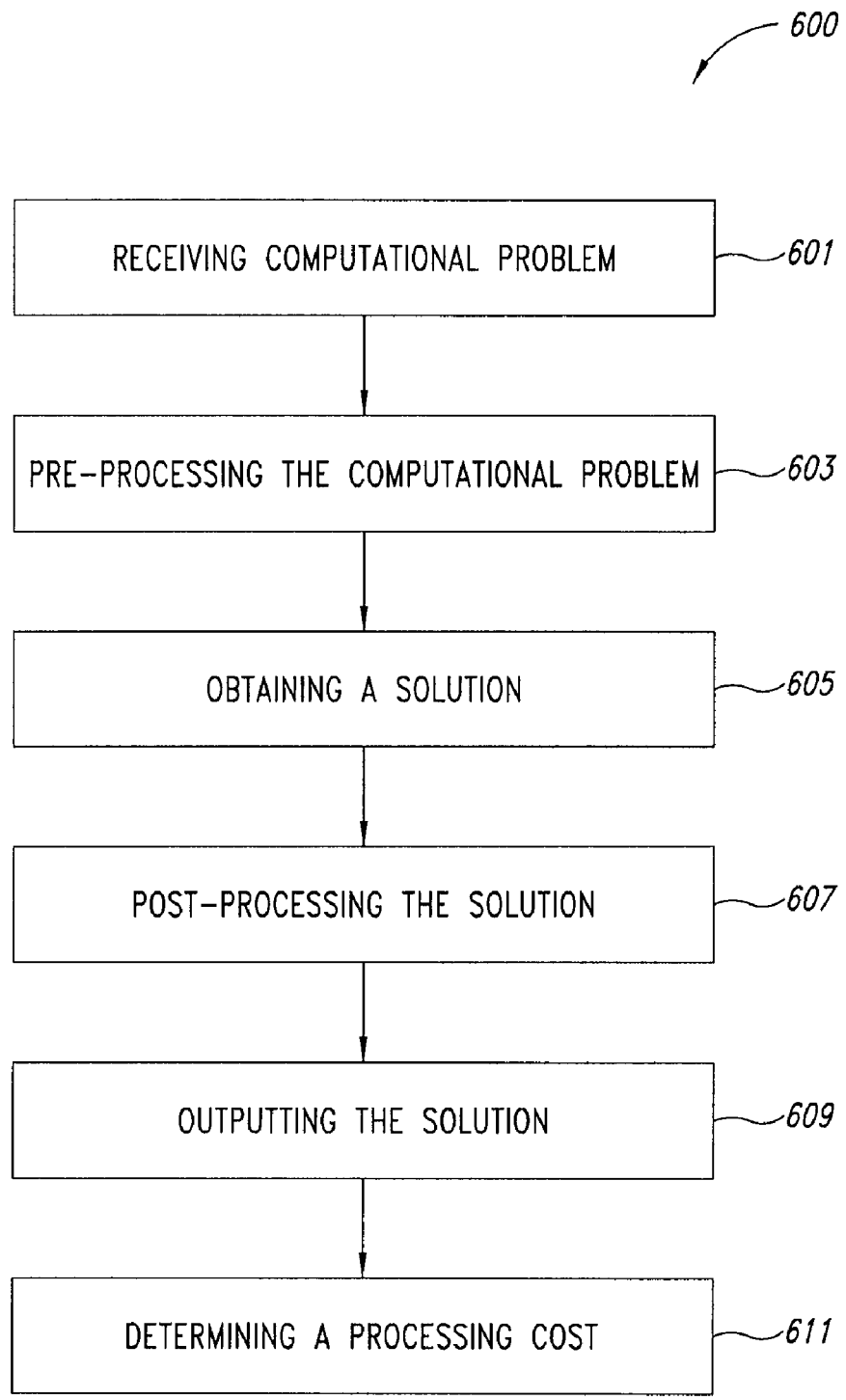
FIG. 6 is a flow diagram of a method for solving computational problems according to another illustrative embodiment.

FIG. 6 shows a flow diagram of a method 600 for solving computational problems according to another illustrative embodiment.

Method 600 includes receiving a computational problem 601, pre-processing computational problem 603, obtaining a solution 607 to computational problem 603 using analog processor 605, post-processing the solution 607, outputting the solution 609, and determining a processing cost 611 associated with obtaining the solution to the computational problem.

In an embodiment, obtaining a solution to the computational problem using analog processor 605 may include performing an evolution. In another embodiment, receiving computational problem 601 may include receiving one or more computational problems from one or more remote user interfaces 442 (FIG. 4). In another embodiment, pre-processing computational problem 603 may include mapping the computational problem onto an analog processor. In another embodiment, determining a processing cost 611 may include one or more of determining at least one of a cost for executing the computational problem processing request, a digital processor usage, a analog processor usage, a consulting cost, and/or an estimate for producing one or more solutions to the computational problem processing requests based in part on a comparison to problems of like complexity.

Determining cost for executing the computational problem processing request may include determining the complexity of the submitted problem, based in part, on a comparison to the previously discussed complexity classes of decision problems. Determining the cost for executing the computational problem processing request may further include identifying previously processed problems of similar complexity, and using the processing information derived from the previously solved like-problem, such as cost, time to solve, to estimate, for example a cost, or processing time for the newly submitted computational problem processing request. The digital processor usage cost, the analog processor usage cost, and the consulting cost, may likewise be estimated from previously solved like-problems. In an embodiment, determining the cost for executing the computational problem processing request may include tracking processing variables such as the digital processor usage cost, the analog processor usage cost, and/or the consulting cost, and providing a rate-based total for processing the computational problem processing request. The consulting cost may include human time spent converting the problem into a target mapping, and/or the embedding of the mapping of the problem onto analog processor 150 (FIG. 1A), human time for providing end user technical support, human time for providing expertise in writing software capable of operating on the analog processor, human time for interpreting results produced by the analog processor, human time spent installing any essential network services, operating system software, and/or problem solving software for users. The consulting cost may further include human time spent instructing one or more user 440 on how to remotely access the problem solving system.

In an embodiment, method 600 may further include receiving a graphical representation of the computational problem, and mapping the computational problem onto analog processor 150. In another embodiment, method 600 may further include storing one or more solution parameters and updating for new parameters. In yet another embodiment, method 600 may further include receiving data indicative of a computational problem to be solved, determining at least a complexity of the computational problem to be solved, automatically estimating a cost associated with solving the computational problem based at least in part on a number of computational problems of similar complexity that have previously been solved, and communicating at least one of execution data, a cost, and a solution via at least one communications link 480 between remote client interface 442 and computational system 410. In another embodiment, method 600 may further include determining whether a user 440 is authorized to access the problem solving system. In an embodiment, method 600 may further include monitoring execution data and the solution to the computational problem, and/or storing the execution data and the solution to the computational problem.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other problem solving systems devices, and methods, not necessarily the exemplary problem solving systems devices, and methods generally described above.

For instance, the foregoing detailed description has set forth various embodiments of the systems, devices, and/or methods via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments.

All of the U.S. patents, U.S. patent application publications, U.S. patent applications, foreign patents, foreign patent applications and non-patent publications referred to in this specification including, but not limited to: U.S. Pat. Nos. 6,838,694, 7,135,701; U.S. Patent Publication Nos. 2005-0082519, 2005-0250651, 2005-0256007, 2006-0226165 and 2006-0147154; are incorporated herein by reference, in their entirety and for all purposes. Aspects of the embodiments can be modified, if necessary, to employ systems, circuits, and concepts of the various patents, applications, and publications to provide yet further embodiments.

These and other changes can be made to the embodiments in light of the above-detailed description. In general, in the following claims, the terms used should not be construed to limit the invention to the specific embodiments disclosed in the specification and the claims, but should be construed to include all possible embodiments along with the full scope of equivalents to which such claims are entitled. Accordingly, the scope of the invention shall only be construed and defined by the scope of the appended claims.

What is claimed is:

1. A problem solving system, comprising:
a first digital processor configured to track computational problem processing requests received from at least one user, and to track at least one of a status and a processing cost for each of the computational problem processing requests;
a first analog processor operable to co-process one or more solutions to at least one computational problem embodied in the computational problem processing requests;
a pre-processing manager configured to receive computational problem processing requests, and to convert a computational problem processing request into a first set of instructions; and
an analog processor interface operable to receive the first set of instructions from the pre-processing manager;
wherein the first analog processor comprises a quantum processor comprising at least two qubits, at least one coupling device, and at least one local bias device; and
wherein the pre-processing manager comprises logic to determine an initial coupling value for the at least one coupling device and to determine an initial local bias value for the at least one local bias device.

2. The problem solving system of claim 1 wherein the processing cost comprises at least one of: an amount indicative of digital processor usage in time, energy, resources, or money; and an amount indicative of analog processor usage in time, energy, resources, or money.

3. The problem solving system of claim 2 wherein the processing cost further comprises an amount indicative of human consulting in time or money.

4. The problem solving system of claim 2 wherein the processing cost further comprises at least one of a pre-processing cost and a post-processing cost, indicative of an amount in at least one of time, energy, resources and money to pre-process or post-process the computational problem solving request, respectively.

5. The problem solving system of claim 4 wherein at least one of the pre-processing cost and the post-processing cost is indicative of a fee for use of a pre-processing program or a post-processing program, respectively.

6. The problem solving system of claim 1 wherein the first digital processor is further configured to determine a processing cost estimate for producing one or more solutions to the computational problem based on at least one of a comparison to problems of like complexity and a comparison to previously solved problems.

7. The problem solving system of claim 1 wherein the first analog processor is operable to co-process one or more solutions to the computational problem via a physical evolution of the first analog processor.

8. The problem solving system of claim 1 wherein the analog processor interface comprises instructions for initializing the quantum processor to a first Hamiltonian, evolving the first Hamiltonian to a second Hamiltonian, and reading out a quantum state of at least one of the at least two qubits.

9. The problem solving system of claim 8 wherein the pre-processing manager comprises instructions for determining the first Hamiltonian.

10. The problem solving system of claim 1 wherein the first set of instructions comprises a vertex set representation of the computational problem.

11. The problem solving system of claim 1 wherein:
the quantum processor further comprises at least one readout device; and
the analog processor interface comprises logic to measure a state of at least one of the at least two qubits in the quantum processor via the at least one readout device.

12. The problem solving system of claim 1 wherein the pre-processing manager comprises logic to map the computational problem into at least one of a problem of an equivalent complexity class, a problem of a greater complexity class, and a problem of a lesser complexity class.

13. The problem solving system of claim 1 wherein the pre-processing manager comprises logic to map the computational problem onto the quantum processor.

14. The problem solving system of claim 13 wherein the logic to map the computational problem onto the quantum processor comprises instructions for mapping the computational problem onto a topological representation and embedding the topological representation onto the quantum processor.

15. The problem solving system of claim 14 wherein the topological representation comprises at least one of a planar graph and a non-planar graph.

16. The problem solving system of claim 1 wherein the pre-processing manager receives the computational problem processing request from a remote user interface.

17. The problem solving system of claim 16 wherein the remote user interface allows the user of the problem solving system to access and operate the problem-solving system via an Internet web browser.

18. The problem solving system of claim 1, further comprising:
a second analog processor redundantly operable to co-process one or more solutions to the at least one computational problem embodied in the computational problem processing requests.

19. The problem solving system of claim 18 wherein the second analog processor is geographically remotely located from the first analog processor.

20. The problem solving system of claim 18 wherein the second analog processor is addressable by the first digital processor.

21. A problem solving system, comprising:
a receiver configured to receive a computational problem processing request, and to provide identity information indicative of an entity responsible for the computational problem processing request;
a pre-processing manager configured to receive the computational problem processing request from the receiver, and convert the computational problem processing request into a first set of instructions;
an analog processor interface configured to receive the first set of instructions from the pre-processing manager;
an analog processor configured to receive a second set of instructions from the analog processor interface, and obtain a solution to the computational problem processing request by a physical evolution of the analog processor;
a post-processing manager configured to convert the solution into a post-processed solution; and
an accounting manager configured to receive the identity information from the receiver, track processing data associated with the computational problem processing request, and provide processing information associated with the computational problem processing request.

22. The problem solving system of claim 21 wherein the analog processor comprises a quantum processor.

23. The problem solving system of claim 21 wherein the processing information comprises at least one of: a cost of pre-processing the computational problem processing request; a cost of post-processing the computational problem processing request; a cost of classical processor usage; a cost of analog processor usage; a cost of human consulting; and a computational problem processing estimate based in part on a comparison to problems of like complexity.

24. The problem solving system of claim 21 wherein the receiver, the pre-processing manager, the analog processor interface, the post-processing manager, and the accounting manager are all implemented in one or more digital computing systems.

25. The problem solving system of claim 21 wherein at least one of the receiver, the pre-processing manager, the analog processor interface, the post-processing manager, and the accounting manager is in a location remote from the analog processor.

26. The problem solving system of claim 21, further comprising:
a communications link for sending and receiving data among at least two of the receiver, the pre-processing manager, the analog processor interface, the analog processor, and the post-processing manager.

27. The problem solving system of claim 21 wherein the analog processor comprises at least two qubits and at least one coupling device; and wherein the pre-processing manager comprises instructions for determining an initial coupling value for the at least one coupling device.

28. The problem solving system of claim 21 wherein the analog processor comprises at least two qubits, at least one coupling device, and at least one local bias device; and wherein the pre-processing manager comprises instructions for determining an initial local bias value for the at least one local bias device.

29. The problem solving system of claim 21 wherein the analog processor comprises at least two qubits; and wherein the analog processor interface comprises instructions for initializing the analog processor to a first Hamiltonian, evolving the analog processor from the first Hamiltonian to a second Hamiltonian, and reading out a quantum state of at least one of the at least two qubits.

30. The problem solving system of claim 27 wherein the pre-processing manager comprises instructions for determining the first Hamiltonian.

31. The problem solving system of claim 21 wherein the analog processor comprises at least two qubits and at least one readout device; the analog processor interface comprises instructions for measuring a state of at least one of the at least two qubits in the analog processor using the at least one readout device; and the post-processing manager comprises instructions for mapping the state onto a topological representation.

32. The problem solving system of claim 21 wherein the pre-processing manager comprises instructions for mapping the computational problem processing request into at least one of a problem of a greater complexity class, problem of a lesser complexity class, and a problem of an equivalent complexity class.

33. The problem solving system of claim 21 wherein the pre-processing manager comprises instructions for mapping the computational problem processing request onto the analog processor.

34. The problem solving system of claim 33 wherein the instructions for mapping the computational problem processing request onto the analog processor comprise instructions for mapping the computational problem processing request onto a graph and embedding the graph onto the analog processor.

35. The problem solving system of claim 21 wherein the receiver receives the computational problem processing request from a remote user interface.

36. The problem solving system of claim 35 wherein the entity responsible for the processing logs into the remote user interface through a secure Internet web page wherein by logging into the remote user interface the entity is identified.

37. A method for solving a computational problem, the method comprising:
  receiving a computational problem processing request via a receiver;
  pre-processing the computational problem processing request via a pre-processing manager, wherein pre-processing the computational problem processing request comprises mapping the computational problem to an analog processor;
  obtaining a solution to the computational problem using anvia the analog processor;
  post-processing the solution via a post-processing manager; and
  determining a processing cost associated with obtaining the solution to the computational problem via an accounting manager configured to track processing data associated with the computational problem processing request and provide processing information associated with the computational problem processing request.

38. The method of claim 37 wherein the analog processor comprises a quantum processor; wherein the computational problem comprises a topological representation; and wherein pre-processing the computational problem processing request comprises mapping the computational problem onto the quantum processor.

39. The method of claim 37 wherein the processing cost comprises at least one of: an amount indicative of digital processor usage in time, energy, resources, or money; and an amount of analog processor usage in time, energy, resources, or money.

40. The method of claim 39 wherein the processing cost further comprises an amount indicative of human consulting in at least one of time and money.

41. The method of claim 37 wherein at least one of pre-processing the computational problem processing request via a pre-processing manager, obtaining a solution to the computational problem via the analog processor, post-processing the solution via a post-processing manager, and determining a processing cost associated with obtaining the solution to the computational problem via an accounting manager is redundantly performed at one or more remote geographical locations.

* * * * *